(12) United States Patent
Bade

(10) Patent No.: US 11,522,947 B1
(45) Date of Patent: Dec. 6, 2022

(54) SYSTEM FOR IMPLEMENTING HYBRID CLOUD COMPUTATION ENGINES USING INFRASTRUCTURE OPTIMIZATION

(71) Applicant: BANK OF AMERICA CORPORATION, Charlotte, NC (US)

(72) Inventor: Vinay Laxmikant Bade, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/342,728

(22) Filed: Jun. 9, 2021

(51) Int. Cl.
*G06F 15/16* (2006.01)
*H04L 67/1008* (2022.01)
*H04L 67/1023* (2022.01)
*H04L 67/1025* (2022.01)
*H04L 67/1029* (2022.01)

(52) U.S. Cl.
CPC ...... *H04L 67/1008* (2013.01); *H04L 67/1023* (2013.01); *H04L 67/1025* (2013.01); *H04L 67/1029* (2013.01)

(58) Field of Classification Search
CPC .............. H04L 67/1008; H04L 67/1023; H04L 67/1025; H04L 67/1029
USPC ........................... 709/202–203; 718/104–105
See application file for complete search history.

(56) References Cited

U.S. PATENT DOCUMENTS

| | | | |
|---|---|---|---|
| 8,909,785 B2* | 12/2014 | Franco | H04L 67/1023 718/104 |
| 11,063,745 B1* | 7/2021 | Du | H04L 67/104 |
| 2018/0285996 A1* | 10/2018 | Ma | H04L 9/3297 |
| 2019/0190697 A1* | 6/2019 | Cunico | H04L 9/50 |
| 2020/0145299 A1* | 5/2020 | Do | H04L 67/10 |
| 2020/0249936 A1* | 8/2020 | Barfield, Jr. | H04L 67/34 |
| 2021/0042803 A1* | 2/2021 | Achkir | G06Q 30/0625 |
| 2021/0201437 A1* | 7/2021 | Yerli | H04L 67/10 |
| 2022/0050825 A1* | 2/2022 | Ramasamy | H04L 9/50 |

\* cited by examiner

*Primary Examiner* — Bharat Barot
(74) *Attorney, Agent, or Firm* — Moore & Van Allen PLLC; R.W. McCord Rayburn

(57) ABSTRACT

Systems, computer program products, and methods are described herein for implementing hybrid cloud computation engines using infrastructure optimization. The present invention may be configured to identify, from a group of available infrastructures, an infrastructure to perform a computing request, where the group of available infrastructures includes an enterprise infrastructure and one or more cloud provider infrastructures. The present invention may be further configured to provide, to the identified infrastructure and via a blockchain distributed ledger, the computing request and input data for the computing request, where the computing request includes a request to generate, using a recurrent neural network, based on data in the blockchain distributed ledger, and based on the input data, output data. The present invention may be further configured to receive, from the identified infrastructure and via the blockchain distributed ledger, the output data.

20 Claims, 6 Drawing Sheets

SYSTEM FOR IMPLEMENTING HYBRID CLOUD COMPUTATION ENGINES USING INFRASTRUCTURE OPTIMIZATION

FIELD OF THE INVENTION

The present invention embraces a system for implementing hybrid cloud computation engines using infrastructure optimization.

BACKGROUND

An entity may maintain and/or operate one or more systems (e.g., enterprise infrastructure, on-premises grid computing resources, and/or the like) for performing complex analytical and quantitative calculations. Such calculations may include determining and/or predicting probabilities, determining and/or predicting costs of resources, batch processing, and/or the like.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, system for implementing hybrid cloud computation engines using infrastructure optimization is presented. The system may include at least one non-transitory storage device and at least one processing device coupled to the at least one non-transitory storage device, where the at least one processing device may be configured to identify, from a group of available infrastructures, an infrastructure to perform a computing request, where the group of available infrastructures includes an enterprise infrastructure and one or more cloud provider infrastructures. The at least one processing device may be configured to provide, to the identified infrastructure and via a blockchain distributed ledger, the computing request and input data for the computing request, where the computing request includes a request to generate, using a recurrent neural network, based on data in the blockchain distributed ledger, and based on the input data, output data, where the blockchain distributed ledger includes a first node stored on the enterprise infrastructure and additional nodes, and where each additional node is stored on one of the one or more cloud provider infrastructures. The at least one processing device may be configured to receive, from the identified infrastructure and via the blockchain distributed ledger, the output data.

In some embodiments, the group of available infrastructures may include two or more cloud provider infrastructures.

In some embodiments, the system and the enterprise infrastructure may be associated with a first entity, and the group of available infrastructures may include a first cloud provider infrastructure associated with a second entity and a second cloud provider infrastructure associated with a third entity.

In some embodiments, the enterprise infrastructure may include applications, grid servers, virtual servers, and at least one data structure.

In some embodiments, the at least one processing device may be configured to, when identifying the infrastructure to perform the computing request, determine, based on pricing data and based on historical infrastructure performance data, which infrastructure, of the group of available infrastructures, is most efficient for performing the computing request and identify the infrastructure that is most efficient for performing the computing request as the infrastructure to perform the computing request. Additionally, or alternatively, the at least one processing device may be configured to, when determining which infrastructure is most efficient for performing the computing request, determine which infrastructure is most cost efficient. In some embodiments, the at least one processing device may be configured to, when determining which infrastructure is most efficient for performing the computing request, determine which infrastructure is most time efficient. Additionally, or alternatively, the at least one processing device may be configured to, when determining which infrastructure is most efficient for performing the computing request, determine, for each infrastructure, a cost of performing the computing request to obtain costs, determine, for each infrastructure, an estimated time to complete performing the computing request to obtain estimated completion times, and determine, based on the costs and the estimated completion times, which infrastructure is most efficient for performing the computing request.

In some embodiments, the at least one processing device may be configured to, before providing the computing request and the input data, encrypt the computing request and the input data to obtain an encrypted computing request and encrypted input data and, when providing the computing request and the input data, provide the encrypted computing request and the encrypted input data.

In some embodiments, the output data may include at least one of one or more prices, one or more probabilities, or processed data from batch processing.

In some embodiments, the at least one processing device may be configured to, when receiving the output data, receive encrypted output data and decrypt the encrypted output data.

In some embodiments, the at least one processing device may be configured to generate a portal including the output data and cause, a user device, to display the portal.

In some embodiments, the at least one processing device may be configured to receive multiple computing requests, identify, from the group of available infrastructures and for each of the computing requests, an infrastructure to perform the computing request, provide, for each of the computing requests and via the blockchain distributed ledger, the computing request and input data for the computing request to the identified infrastructure, and receive, from each identified infrastructure and via the blockchain distributed ledger, output data for each of the computing requests.

In another aspect, a computer program product for implementing hybrid cloud computation engines using infrastructure optimization is presented. The computer program product may include a non-transitory computer-readable medium including code causing a first apparatus to identify, from a group of available infrastructures, an infrastructure to perform a computing request, where the group of available infrastructures includes an enterprise infrastructure and one or more cloud provider infrastructures. The computer program product may include a non-transitory computer-readable medium including code causing the first apparatus to provide, to the identified infrastructure and via a blockchain distributed ledger, the computing request and input data for the computing request, where the computing request includes a request to generate, using a recurrent neural network, based on data in the blockchain distributed ledger, and based on the input data, output data, where the blockchain distributed ledger includes a first node stored on the enterprise infrastructure and additional nodes, and where each additional node is stored on one of the one or more cloud provider infrastructures. The computer program product may include a non-transitory computer-readable medium including code causing the first apparatus to receive, from the identified infrastructure and via the blockchain distributed ledger, the output data.

In some embodiments, the group of available infrastructures may include two or more cloud provider infrastructures.

In some embodiments, the system and the enterprise infrastructure may be associated with a first entity, and the group of available infrastructures may include a first cloud provider infrastructure associated with a second entity and a second cloud provider infrastructure associated with a third entity.

In some embodiments, the enterprise infrastructure may include applications, grid servers, virtual servers, and at least one data structure.

In some embodiments, the computer program product may include a non-transitory computer-readable medium comprising code causing a first apparatus to determine, based on pricing data and based on historical infrastructure performance data, which infrastructure, of the group of available infrastructures, is most efficient for performing the computing request and identify the infrastructure that is most efficient for performing the computing request as the infrastructure to perform the computing request. Additionally, or alternatively, the computer program product may include a non-transitory computer-readable medium comprising code causing a first apparatus to, when determining which infrastructure is most efficient for performing the computing request, determine which infrastructure is most cost efficient.

In yet another aspect, a method for implementing hybrid cloud computation engines using infrastructure optimization is presented. The method may include identifying, from a group of available infrastructures, an infrastructure to perform a computing request, where the group of available infrastructures includes an enterprise infrastructure and one or more cloud provider infrastructures. The method may include providing, to the identified infrastructure and via a blockchain distributed ledger, the computing request and input data for the computing request, where the computing request includes a request to generate, using a recurrent neural network, based on data in the blockchain distributed ledger, and based on the input data, output data, where the blockchain distributed ledger includes a first node stored on the enterprise infrastructure and additional nodes, and where each additional node is stored on one of the one or more cloud provider infrastructures. The method may include receiving, from the identified infrastructure and via the blockchain distributed ledger, the output data.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
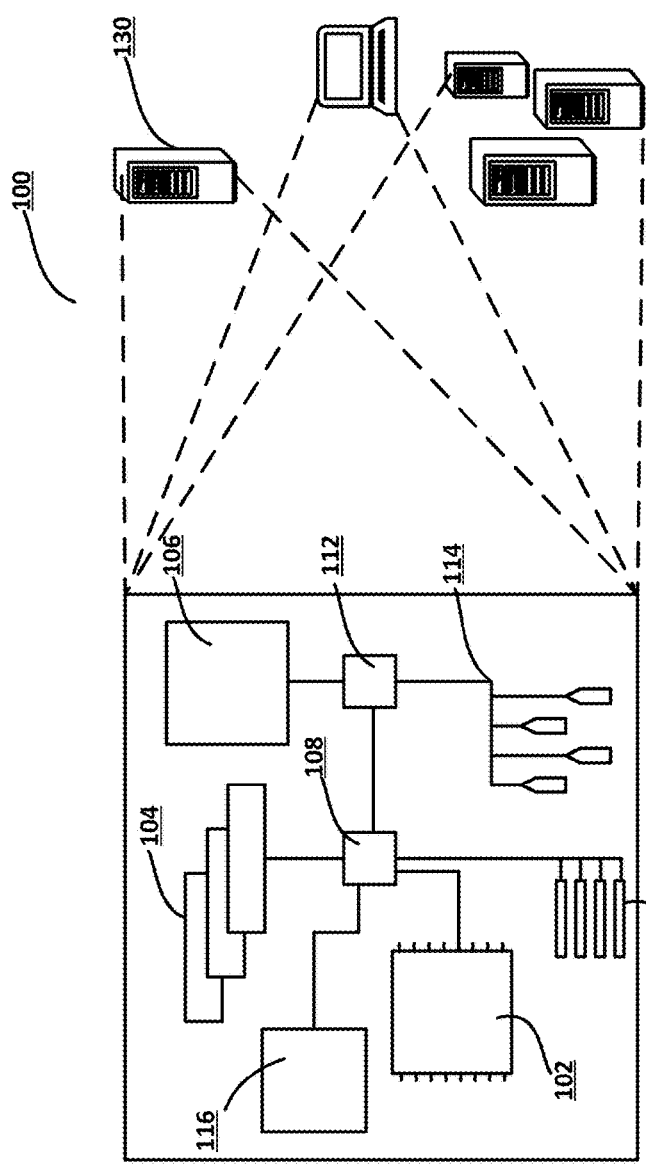
Figure 1:
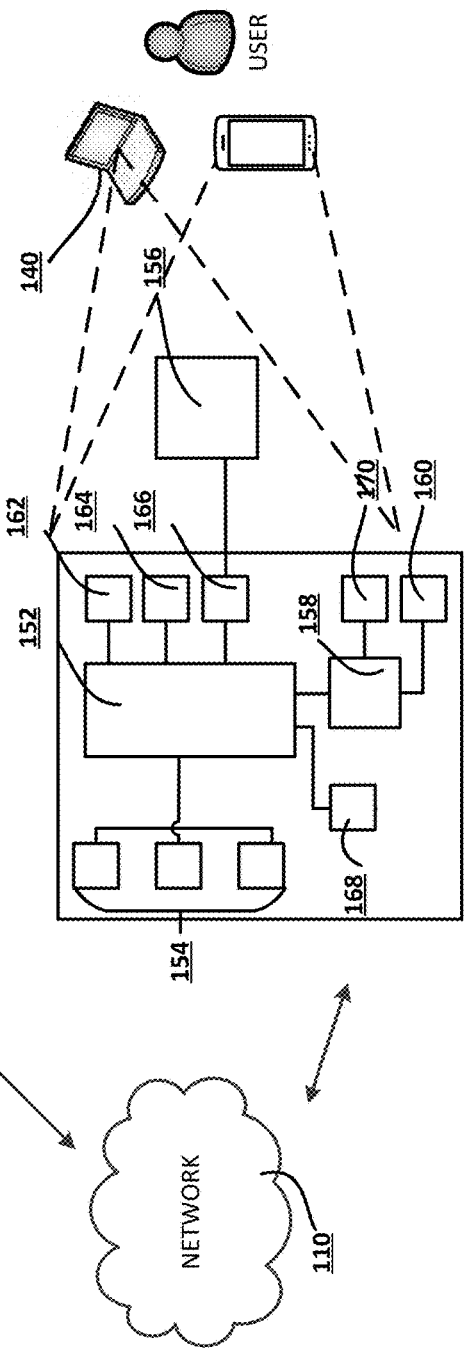
Figure 2:
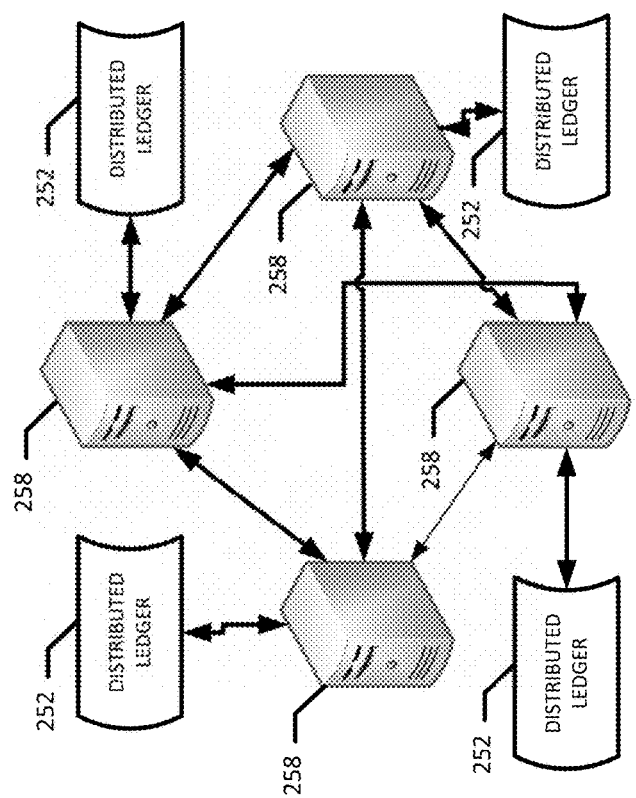
Figure 3:
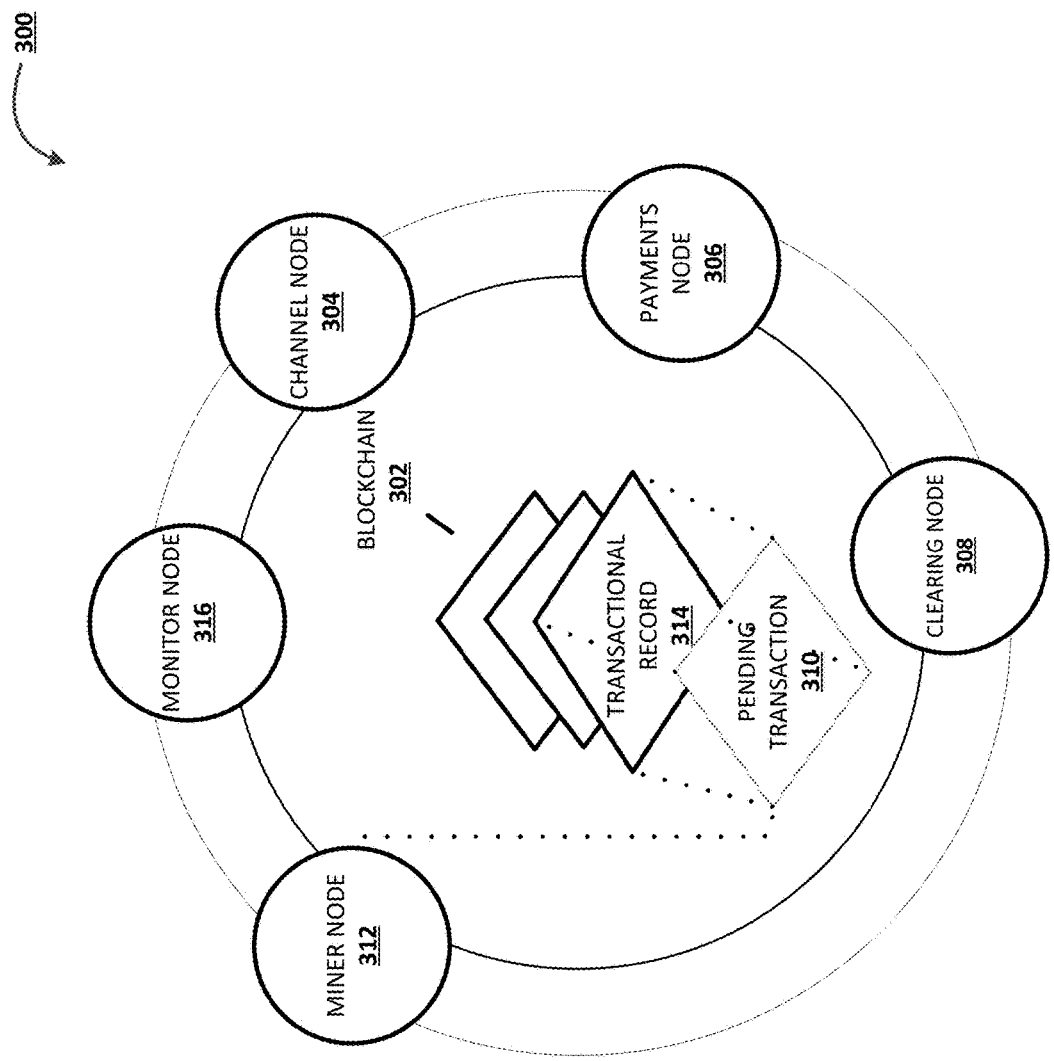
Figure 4:
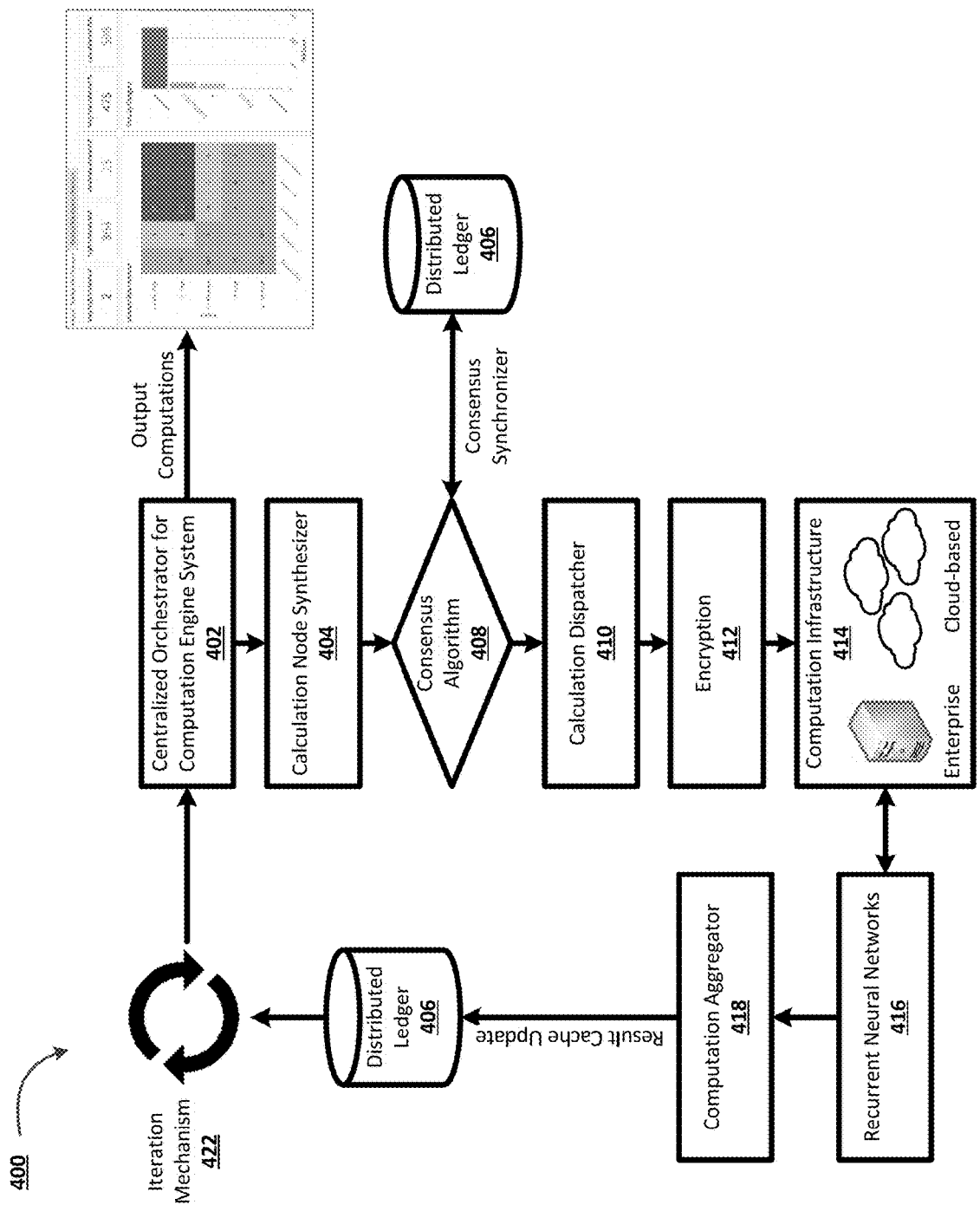
Figure 5:
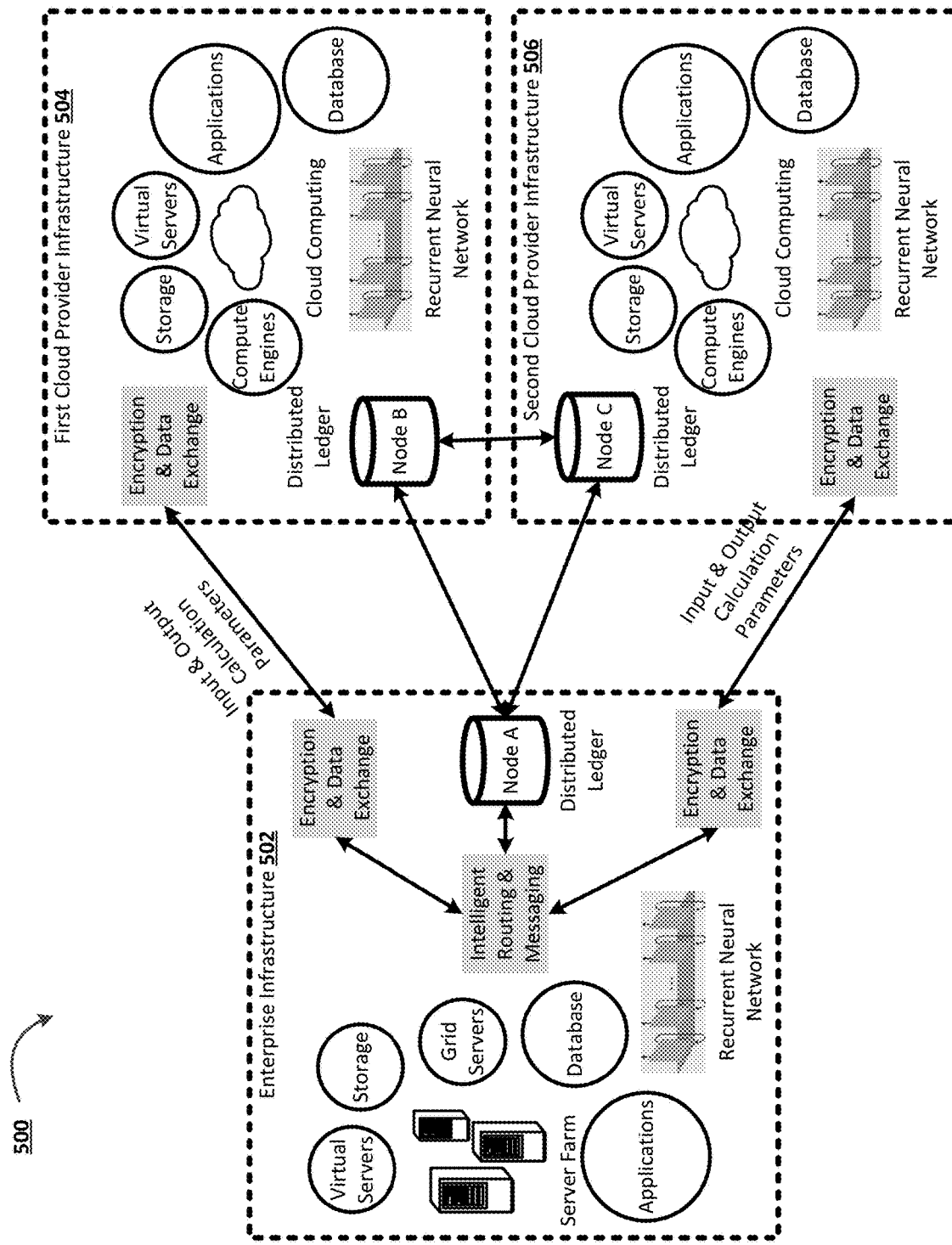
Figure 6:
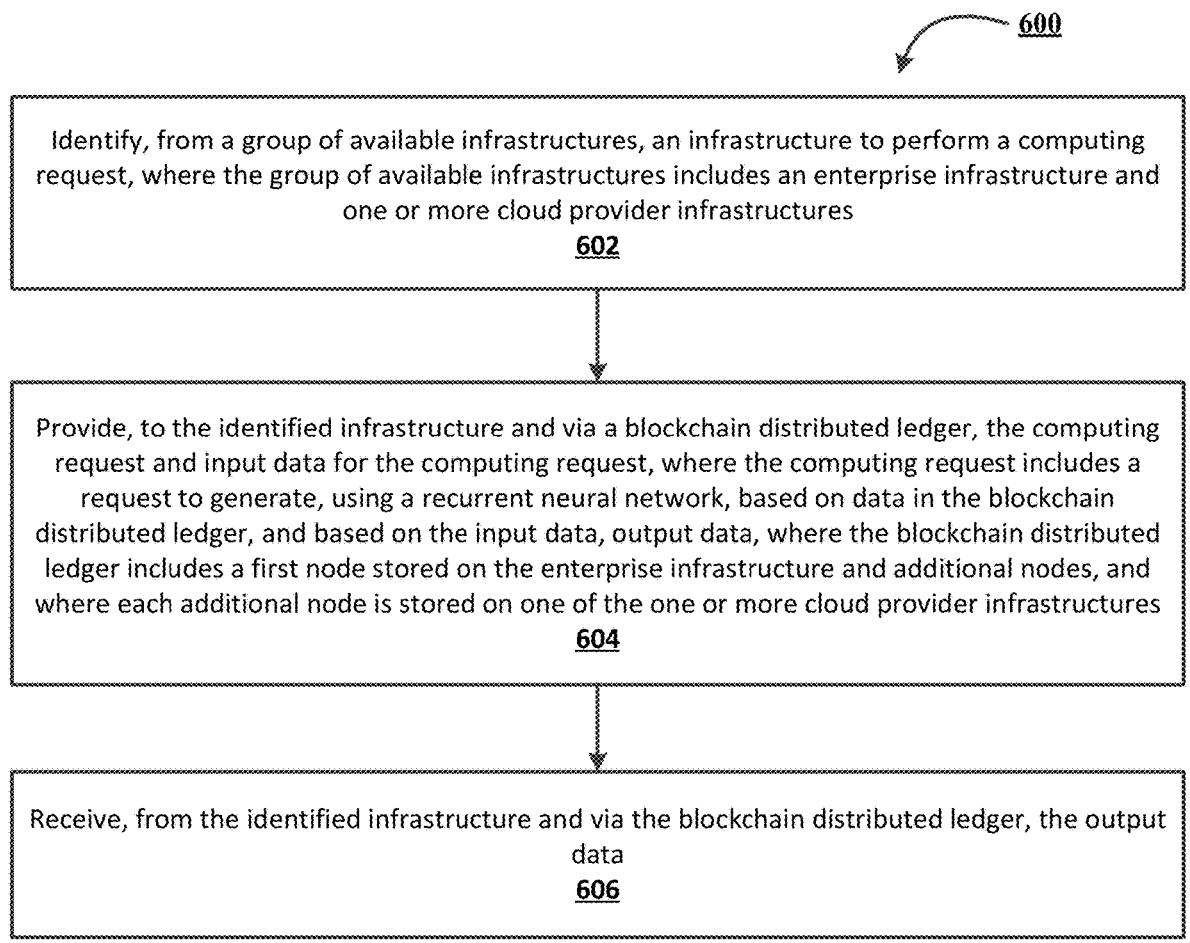

Having thus described embodiments of the invention in general terms, reference will now be made the accompanying drawings, wherein:

FIG. 1 illustrates technical components of a system for implementing hybrid cloud computation engines using infrastructure optimization, in accordance with an embodiment of the invention;

FIG. 2 provides a high-level block chain system environment architecture, in accordance with an embodiment of the invention;

FIG. 3 provides a high-level process flow illustrating node interaction within a block chain system environment architecture, in accordance with one embodiment of the invention;

FIG. 4 illustrates a process flow for implementing hybrid cloud computation engines using infrastructure optimization, in accordance with an embodiment of the invention;

FIG. 5 illustrates a system environment for implementing hybrid cloud computation engines using infrastructure optimization, in accordance with an embodiment of the invention; and FIG. 6 illustrates a process flow for implementing hybrid cloud computation engines using infrastructure optimization, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an entity may maintain and/or operate one or more systems (e.g., enterprise infrastructure, on-premises grid computing resources, and/or the like) for performing complex analytical and quantitative calculations. Such calculations may include determining and/or predicting probabilities, determining and/or predicting costs of resources, batch processing, and/or the like. However, increasing demand for performing complex analytical and quantitative calculations requires increased hardware and infrastructure for the entity, which consumes significant resources (e.g., financial resources, computing resources, network resources, and/or the like). Cloud-based infrastructure may be used; however, using such infrastructure requires increased data security, which consumes significant resources (e.g., financial resources, computing resources, network resources, and/or the like). Furthermore, an entity may use both enterprise infrastructure and cloud-based infrastructure as well as multiple cloud-based infrastructure providers, but coordinating and/or determining which infrastructure performs which calculations (e.g., computing requests and/or the like) consumes significant resources (e.g., financial resources, computing resources, network resources, and/or the like).

Some embodiments described herein provide a system, a computer program product, and/or a method for implementing hybrid cloud computation engines using infrastructure optimization. For example, a system (e.g., an electronic system for implementing hybrid cloud computation engines using infrastructure optimization and/or the like) may be configured to use intelligent routing and messaging, distributed ledgers, and recurrent neural networks to determine whether an enterprise infrastructure or one or more cloud-provider infrastructures should perform computing requests, provide computing requests and input data to the identified infrastructures, and receive output data from the infrastructures after processing of the computing requests and input data.

In some embodiments, the system may use intelligent routing to determine which available infrastructure would be most efficient from a time and/or cost perspective based on historical performance of the available infrastructures and historical and/or current pricing for using the available infrastructures. By determining which available infrastructure would be most efficient from a time and/or cost perspective, the system may conserve resources (e.g., financial resources, computing resources, network resources, and/or the like) that would otherwise be consumed by inefficient assignment of computing requests to the available infrastructures.

In some embodiments, the system may use distributed ledgers having nodes at each of the available infrastructures to share data between the available infrastructures. By using distributed ledgers, the system may efficiently maintain data security in a distributed computing model, which conserves resources (e.g., financial resources, computing resources, network resources, and/or the like) that would otherwise be consumed by identifying data breaches, resolving data breaches, repairing data after breaches, and/or the like.

In some embodiments, the system may instruct the available infrastructures to use the recurrent neural networks to perform the computing requests. By using recurrent neural networks, the available infrastructures and/or the system may obtain more accurate output data from the computing requests because the recurrent neural network may use a bi-temporal/time series and/or historical data driven algorithm as well as current data for input parameters to compute predictions. By obtaining more accurate output data, the system may conserve resources (e.g., financial resources, computing resources, network resources, and/or the like) that would otherwise be consumed by obtaining less accurate data, making decisions based on less accurate data, correcting incorrect decisions, and/or the like.

In some embodiments, a system may use multiple cloud-based providers including cloud-based computation engines to provide flexibility for computing calculations and/or processing, which may include real-time price calculations, real-time probability calculations, end-of-day batch processing, and/or the like. Additionally, or alternatively, the cloud-based computation engines may leverage one or more recurrent neural networks as previous calculations (e.g., a previous day's price calculation, probability calculation, and/or the like). In some embodiments, the cloud-based providers may use different encryptions standards for network communication and/or data transfer (e.g., transfer of input parameters and output parameters and/or the like).

In some embodiments, the system may use distributed ledgers to facilitate distribution of each calculation step to on-premises infrastructure and/or one or more cloud-based providers. Additionally, or alternatively, the cloud-based providers may compete with each other to provide more calculation nodes for the system. The system may use the distributed ledgers to facilitate efficient usage between the on-premises infrastructure and cloud-based providers. By combining cloud-based computation, cloud-based databases, and cloud-based storage with distributed ledgers, the system may provide enterprise level data security and/or data exchange in a distributed computing model. Additionally, or alternatively, the system may split complex calculation across various parallel functions and/or technology components to improve redundancy and/or yield faster and/or more efficient calculations.

In some embodiments, the system may use recurrent neural networks (e.g., rather than a regular neural network) for calculations (e.g., financial computations, such as price calculations, probability hedging, historical based calculations, and/or the like). The recurrent neural networks may provide bi-temporal/time series and historical data driven algorithms for input parameters (e.g., historical resource transfers, historical market data parameters, historical financial instruments, historical stock tickers, historical loans, historical fixed returns securities, historical prices, and/or the like) as well as current data parameters (e.g., market data parameters). In some embodiments, the recurrent neural networks may include various neural nodes for each input parameter. Additionally, or alternatively, the output from a neural network may include a continuous time series streaming of predictive prices for each of the nodes. For example, a neural network may include separate nodes for each parameter (e.g., financial probability measures, resource pricing, client financial models, historical financial resource transfers (e.g., equities, current positions, probability metrics, and/or the like), current and historical market driven parameters, such as indices, market current pricing trends, macro-economic factors, and/or the like).

In some embodiments, the system may use distributed ledgers for data security and computation handling in a hybrid cloud environment (e.g., between an entity and multiple cloud providers). Additionally, or alternatively, the system may use cloud computation, cloud database, and/or cloud storage with one or more distributed ledges to provide enterprise level data security and/or data exchange in a distributed computing model (e.g., a model including multiple infrastructures and/or computing engines performing calculations, where the calculations may be interrelated). In some embodiments, the system may provide a statistical modelling driven price quoting enterprise platform.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution," an "allocation," and/or a "transfer" may refer to any transaction, activities, and/or communication between one or more entities, between a user and one or more entities, and/or the like. A resource distribution, a resource allocation, and/or a resource transfer of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution, a resource allocation, and/or a resource transfer may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution, a resource allocation, and/or a resource transfer using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution, a resource allocation, and/or a resource transfer may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution, a resource allocation, and/or a resource transfer may refer to financial transactions involving direct or indirect movement of funds through traditional paper transaction processing systems (e.g., paper check processing) or through electronic transaction processing systems. In this regard, resource distributions, allocations of resources, and/or resource transfers may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, a "blockchain" may be a form of distributed ledger technology which employs a chain of blocks to secure and validate distributed consensus. A blockchain may be distributed across and managed by peer-to-peer networks. Since it is a distributed ledger, it may exist without a centralized authority or server managing it, and its data quality may be maintained by database replication and computational trust. However, the structure of the blockchain makes it distinct from other kinds of distributed ledgers. Data on a blockchain is grouped together and organized in blocks. The blocks are then linked to one another and secured using cryptography. A blockchain may provide numerous advantages over traditional databases. A large number of computing devices with access to a blockchain may reach a consensus regarding the validity of a transaction contained on the transaction ledger. Thus, a "valid" transaction is one that can be validated based on a set of rules that are defined by the particular system implementing the blockchain. A blockchain's append-only structure only allows data to be added to the database: altering or deleting previously entered data on earlier blocks is impossible. Blockchain technology is therefore well-suited for recording events, managing records, processing transactions, tracing resources, and polling. For purposes of the invention, the term "blockchain" and "distributed ledger" may be used interchangeably.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for implementing hybrid cloud computation engines using infrastructure optimization within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like calculations, computing requests, processing, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for implementing hybrid cloud computation engines using infrastructure optimization, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multiprocessor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more computing request management systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate one or more computing requests, and/or the like (e.g., on a similar to the system 130, running a system similar to the system 130, and/or the like). In some embodiments, the user input system and/or the computing request management system associated with the entity may perform one or more of the steps described herein with respect to the process flow described herein with respect to FIGS. 3-5.

FIG. 2 provides a high-level block chain system environment architecture, in accordance with an embodiment of the invention. A block chain may be a distributed database that maintains a list of data blocks, such as real-time resource availability associated with one or more accounts and/or the like, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data blocks recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of data and the resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria.

As mentioned above and referring to FIG. 2, a block chain system 200 is typically decentralized—meaning that a distributed ledger 252 (i.e., a decentralized ledger) is maintained on multiple nodes 258 of the block chain 200. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include timestamping, such as is used in cryptocurrency block chains. In some embodiments, the nodes 258 of the system might be financial institutions that function as gateways for other financial institutions. For example, a credit union might hold the account, but access the distributed system through a sponsor node.

Various other specific-purpose implementations of block chains have been developed. These include distributed domain name management, decentralized crowdfunding, synchronous/asynchronous communication, decentralized real-time ride sharing and even a general-purpose deployment of decentralized applications.

FIG. 3 provides a high-level process flow illustrating node interaction within a block chain system environment architecture 300, in accordance with one embodiment of the present invention. As illustrated and discussed above, the block chain system may include at least one or more nodes used to generate blocks. In some embodiments, the channel node 304, payments node 306, monitor node 316 or the clearing node 308 may publish a pending transaction 310 to the block chain 302. At this stage, the transaction has not yet been validated by the miner node(s) 312, and the other nodes will delay executing their designated processes. The miner node 312 may be configured to detect a pending transaction 310. Upon verifying the integrity of the data in the pending transaction 310, the miner node 312 validates the transaction and adds the data as a transactional record 314, which is referred to as a block to the block chain 302. Once a transaction has been authenticated in this manner, the nodes will consider the transactional record 314 to be valid and thereafter execute their designated processes accordingly. The transactional record 314 will provide information about the transaction processed and transmitted through and metadata coded therein for searchability of the transactional record 314 within a distributed ledger.

In some embodiments, the system may comprise at least one additional miner node 312. The system may require that pending transactions 310 be validated by a plurality of miner nodes 312 before becoming authenticated blocks on the block chain. In some embodiments, the systems may impose a minimum threshold number of miner nodes 312 needed. The minimum threshold may be selected to strike a balance between the need for data integrity/accuracy (i.e., security/immutability) versus expediency of processing. In this way, the efficiency of the computer system resources may be maximized.

Furthermore, in some embodiments, a plurality of computer systems are in operative networked communication with one another through a network. The network may be a system specific distributive network receiving and distributing specific network feeds and identifying specific network associated triggers.

In some embodiments, the computer systems represent the nodes of the block chain, such as the miner node or the like. In such an embodiment, each of the computer systems comprise the block chain, providing for decentralized access to the block chain as well as the ability to use a consensus mechanism to verify the integrity of the data therein. In some embodiments, an upstream system and a downstream system are further operatively connected to the computer systems and each other through the network. The upstream system further comprises a ledger and the block chain. The downstream system further comprises the block chain and an internal ledger, which in turn comprises a copy of the ledger.

In some embodiments, a copy of block chain may be stored on a durable storage medium within the computer systems or the upstream system or the downstream system. In some embodiments, the durable storage medium may be RAM. In some embodiments, the durable storage medium may be a hard drive or flash drive within the system.

Smart contracts, as described herein, are computer processes that facilitate, verify and/or enforce negotiation and/or performance of a contract between parties. Smart contracts include logic that emulates contractual clauses that are partially or fully self-executing and/or self-enforcing. The smart contracts provide guidelines for transfer of data, regulation, and control of the chains within the system. The smart contracts may further define consensus (e.g., proof of work) and encryption mechanisms for the data stored in the regulatory chains. In some embodiments, cross-chain smart contracts may be configured to dynamically form one or more additional chains or relationships between one or more nodes or chains within the architecture (e.g., regulatory hyperchains). In some embodiments, one or more cross-chain smart contracts may control and enforce the movement and/or regulation of data between a plurality of block chains.

FIG. 4 illustrates a process flow 400 for implementing hybrid cloud computation engines using infrastructure optimization, in accordance with an embodiment of the invention. In some embodiments, a computing request management system, a system for implementing hybrid cloud computation engines using infrastructure optimization, and/or the like may perform one or more of the steps of process flow 400.

As shown in FIG. 4, the process flow 400 may include a centralized orchestrator for a computation engine system 402, a calculation node synthesizer 404, a distributed ledger 406, a consensus algorithm 408, a calculation dispatcher 410, an encryption process 412, computation infrastructure 414, recurrent neural networks 416, a computation aggregator 418, and an iteration mechanism 420. In some embodiments, the computing request management system, the system for implementing hybrid cloud computation engines using infrastructure optimization, and/or the like may include the centralized orchestrator for the computation engine system 402, the calculation node synthesizer 404, the distributed ledger 406, the consensus algorithm 408, the calculation dispatcher 410, the encryption process 412, computation infrastructure 414, the recurrent neural networks 416, the computation aggregator 418, and the iteration mechanism 420.

As shown in FIG. 4, the process flow 400 may include providing, with the centralized orchestrator for the computation engine system 402, data to the calculation node synthesizer 404. For example, the centralized orchestrator for the computation engine system 402 may receive (e.g., from another user device, from another system, from a scheduler, and/or the like) a request (e.g., a computing request, a calculation request, and/or the like) and provide the request to the calculation node synthesizer 404.

As shown in FIG. 4, the process flow 400 may include determining, with the calculation node synthesizer 404, which infrastructure of the computation infrastructure 414 should perform the request. For example, the calculation node synthesizer 404 may determine which available infrastructure of the computation infrastructure 414 would be most efficient from a time and/or cost perspective based on historical performance of the available infrastructures and historical and/or current pricing for using the available infrastructures. In some embodiments, the process flow 400 may include determining, with the calculation node synthesizer 404, which node of the distributed ledger 406 corresponds to the available infrastructure of the computation infrastructure 414 that would be most efficient for performing the request. As shown in FIG. 4, the process flow 400 may include providing, with the calculation node synthesizer 404, data identifying the identified infrastructure and/or node to the consensus algorithm 408.

As also shown FIG. 4, the process flow 400 may include performing, with the consensus algorithm 408 and the distributed ledger 406, a consensus synchronization. For example, the consensus algorithm 408 may add data associated with the request to the distributed ledger 406 (e.g., for validation by the blockchain on the distributed ledger 406 and/or the like).

As shown in FIG. 4, the process flow 400 may include providing, with the consensus algorithm 408, data associated with the request to the calculation dispatcher 410. In some embodiments, the process flow 400 may include determining, based on the data and with the calculation dispatcher 410, input parameters (e.g., market data, environment parameters, and/or the like) for the request.

As shown in FIG. 4, the process flow 400 may include providing, with the calculation dispatcher 410, the input parameters to the encryption process 412. In some embodiments, the process flow 400 may include encrypting, via the encryption process 412, data, such as the input parameters, analytics libraries associated with the request, and/or the like. As shown in FIG. 4, the process flow 400 may include providing the encrypted data to the computation infrastructure 414.

In some embodiments, and as shown in FIG. 4, the computation infrastructure 414 may include enterprise infrastructure and cloud-based infrastructure. For example, an entity operating and/or maintaining the computing request management system, the system for implementing hybrid cloud computation engines using infrastructure optimization, and/or the like may also operate and/or maintain the enterprise infrastructure, and one or more other entities (e.g., cloud-based computation engine providers and/or the like) may operate and/or maintain one or more different cloud-based infrastructures. In some embodiments, the computation infrastructure 414 may include one or more computation engines (e.g., enterprise computation engines, cloud-based computation engines, and/or the like), and the computation engines may be configured to receive input data, perform one or more computations based on the input data, and generate output data, such as prices, probabilities, processed data, and/or the like.

In some embodiments, when the process flow 400 includes providing data to the enterprise infrastructure, the process flow 400 may omit the step of encrypting the data using the encryption process 412. Additionally, or alternatively, when the process flow 400 includes providing data to the cloud-based infrastructure, the process flow 400 may include providing, to the cloud-based infrastructure, a key for decrypting the data.

In some embodiments, and as shown in FIG. 4, the process flow 400 may include exchanging data (e.g., input data, output data, historical data, and/or the like) between the computation infrastructure 414 and the recurrent neural networks 416. For example, the process flow may include performing, with the computation infrastructure 414, one or more calculations using the recurrent neural networks 416. In some embodiments, the process flow 400 may include performing, with the recurrent neural networks 416, calculations based on historical probabilities and/or historical price data. Additionally, or alternatively, the recurrent neural networks 416 may include bi-temporal/time-series-based measures. In some embodiments, output data from the computation infrastructure 414 may be used to update and/or improve the recurrent neural networks 416.

As shown in FIG. 4, the process flow 400 may include providing, to the computation aggregator 418, output data. In some embodiments, process flow 400 may include aggregating, with the computation aggregator 418, output data from a plurality of calculations performed by the computation infrastructure 414 and/or the recurrent neural networks 416. For example, the computation aggregator 418 may aggregate the output data in a results cache.

As shown in FIG. 4, the process flow 400 may include updating, based on the results cache, the distributed ledger 406. For example, the computation aggregator 418 may provide the output data to the distributed ledger 406. In some embodiments, the computation aggregator 418 may provide the output data to the distributed ledger 406 in real-time. Additionally, or alternatively, the process flow 400 may include providing, with the computation aggregator 418, the output data and/or the results cache to a node of the distributed ledger 406.

As shown in FIG. 4, the process flow 400 may include iterating, with the iteration mechanism 420, one or more other computations, calculations, and/or the like. For example, the output data from a computation and/or a calculation may be provided to the computation infrastructure 414 as input data for another computation and/or another calculation. In some embodiments, the iteration mechanism 420 may perform one or more computation and/or calculation loops.

As shown in FIG. 4, the process flow 400 may include outputting the computations. For example, the process flow 400 may include, after completing all of the computations (e.g., associated with a request), outputting the results of the computations. In some embodiments, the results of the computations may be output to one or more dashboards, as shown in FIG. 4.

Process flow 400 may include additional embodiments, such as any single embodiment or any combination of embodiments described below and/or in connection with one or more other processes described elsewhere herein. Although FIG. 4 shows example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

FIG. 5 illustrates a system environment 500 for implementing hybrid cloud computation engines using infrastructure optimization, in accordance with an embodiment of the invention. In some embodiments, one or more of the components and/or systems in system environment 500 may perform one or more of the processes, methods, and/or process flows as described herein. Additionally, or alternatively, each of the components and/or systems in system environment 500 may include and/or be a portion of one or more systems as described herein with respect to FIG. 1.

As shown in FIG. 5, the system environment 500 may include an enterprise infrastructure 502, a first cloud provider infrastructure 504, and a second cloud provider infrastructure 506. Although only two cloud provider infrastructures are shown in the system environment 500 of FIG. 5, some embodiments of the system environment 500 may include any number of cloud provider infrastructures. Furthermore, the number of cloud provider infrastructures in the system environment 500 may change over time.

In some embodiments, and as shown in FIG. 5, the enterprise infrastructure 502 may include a server farm providing virtual servers, storage, grid servers, databases, applications, and/or the like. The enterprise infrastructure 502 may also include and/or have access to a recurrent neural network and a node A of a distributed ledger. In some embodiments, the enterprise infrastructure 502 may include on-premises infrastructure owned, operated, and/or maintained by an entity. As shown in FIG. 5, the enterprise infrastructure 502 may include one or more systems and/or applications for performing intelligent routing and messaging and encryption and data exchange. In some embodiments, the enterprise infrastructure 502 may perform intelligent routing and messaging and encryption and data exchange with the distributed ledger (e.g., via node A), the first cloud provider infrastructure 504, and the second cloud provider infrastructure 506. For example, and as shown in FIG. 5, the enterprise infrastructure 502 may perform encryption and data exchange with the first cloud provider infrastructure 504 and the second cloud provider infrastructure 506 to provide and receive input and output calculation parameters.

As shown in FIG. 5, each of the first cloud provider infrastructure 504 and the second cloud provider infrastructure 506 may include a cloud computing system for providing computing engines, storage, virtual servers, applications, databases, and/or the like. Each of the first cloud provider infrastructure 504 and the second cloud provider infrastructure 506 may also include and/or have access to a recurrent neural network. As shown in FIG. 5, the first cloud provider infrastructure 504 includes and/or has access to a node B of the distributed ledger, and the second cloud provider infrastructure 506 includes and/or has access to a node C of the distributed ledger. In some embodiments, the first cloud provider infrastructure 504 and the second cloud provider infrastructure 506 may also include one or more systems and/or applications for performing encryption and data exchange with the enterprise infrastructure 502. For example, and as shown in FIG. 5, each of the first cloud provider infrastructure 504 and the second cloud provider infrastructure 506 may perform encryption and data exchange with the enterprise infrastructure 502 to provide and receive input and output calculation parameters.

In some embodiments, an entity that owns, operates, and/or maintains the enterprise infrastructure 502 may use the system environment 500 to utilize the cloud-based computation engines of the third-party cloud provider infrastructures (e.g., the first cloud provider infrastructure 504, the second cloud provider infrastructure 506, and/or the like) for computing, calculations, and/or processing, such as price calculations, probability calculations, real-time calculations, batch processing, and/or the like (e.g., in real-time, at end-of-day, within a time window, and/or the like). Additionally, or alternatively, the entity may leverage the recurrent neural network to provide more accurate calculations (e.g., based on historical data, such as a calculation from a prior day and/or the like). In some embodiments, the system environment 500 may ensure encryption standards for network communication for data transfer (e.g., of input and output calculation parameters, messaging, computation instructions, historical data, and/or the like).

In some embodiments, the system environment 500 may use the distributed ledger mechanism to facilitate distribution of each calculation step to either the enterprise infrastructure 502 or one of the third-party cloud provider infrastructures (e.g., the first cloud provider infrastructure 504, the second cloud provider infrastructure 506, and/or the like). By using the distributed ledger mechanism, the system environment 500 may facilitate efficient coordination between the enterprise infrastructure 502 and the third-party cloud provider infrastructures.

System environment 500 may include additional embodiments, such as any single embodiment or any combination of embodiments described herein and/or in connection with one or more other processes described elsewhere herein. For example, system environment 500, the infrastructures of system environment 500, the systems of system environment 500, and/or the components of system environment 500 may include additional or fewer elements, applications, capabilities, and/or the like than those described herein with respect to FIG. 5.

FIG. 6 illustrates a process flow 600 for implementing hybrid cloud computation engines using infrastructure optimization within a technical environment, in accordance with an embodiment of the invention. In some embodiments, a computing request management system, a system for implementing hybrid cloud computation engines using infrastructure optimization, and/or the like (e.g., similar to one or more of the systems and/or system environments described herein with respect to FIGS. 1 and 5) may perform one or more of the steps of process flow 600.

As shown in block 602, the process flow 600 may include identifying, from a group of available infrastructures, an infrastructure to perform a computing request, where the group of available infrastructures includes an enterprise infrastructure and one or more cloud provider infrastructures. For example, a computing request management system and/or a system for implementing hybrid cloud computation engines using infrastructure optimization may identify, from a group of available infrastructures, an infrastructure to perform a computing request. In some embodiments, the group of available infrastructures may include an enterprise infrastructure and multiple cloud provider infrastructures.

As shown in block 604, the process flow 600 may include providing, to the identified infrastructure and via a blockchain distributed ledger, the computing request and input data for the computing request, where the computing request includes a request to generate, using a recurrent neural network, based on data in the blockchain distributed ledger, and based on the input data, output data, where the blockchain distributed ledger includes a first node stored on the enterprise infrastructure and additional nodes, and where each additional node is stored on one of the one or more cloud provider infrastructures. For example, a computing request management system and/or a system for implementing hybrid cloud computation engines using infrastructure optimization may provide, to the identified infrastructure and via a blockchain distributed ledger, the computing request and input data for the computing request. In some embodiments, the computing request may include a request to generate, using a recurrent neural network, based on data in the blockchain distributed ledger, and based on the input data, output data. Additionally, or alternatively, the blockchain distributed ledger may include a first node stored on the enterprise infrastructure and additional nodes. In some embodiments, each additional node may be stored on one of the one or more cloud provider infrastructures.

As shown in block 606, the process flow 600 may include receiving, from the identified infrastructure and via the blockchain distributed ledger, the output data. For a computing request management system and/or a system for implementing hybrid cloud computation engines using infrastructure optimization may example, receive, from the identified infrastructure and via the blockchain distributed ledger, the output data.

Process flow 600 may include additional embodiments, such as any single embodiment or any combination of embodiments described below and/or in connection with one or more other processes described elsewhere herein.

In a first embodiment, the group of available infrastructures may include two or more cloud provider infrastructures.

In a second embodiment alone or in combination with the first embodiment, the system and the enterprise infrastructure may be associated with a first entity, and the group of available infrastructures may include a first cloud provider infrastructure associated with a second entity and a second cloud provider infrastructure associated with a third entity.

In a third embodiment alone or in combination with any of the first through second embodiments, the enterprise infrastructure may include applications, grid servers, virtual servers, and at least one data structure.

In a fourth embodiment alone or in combination with any of the first through third embodiments, the process flow 600 may include, when identifying the infrastructure to perform the computing request, determining based on pricing data and based on historical infrastructure performance data, which infrastructure, of the group of available infrastructures, is most efficient for performing the computing request and identifying the infrastructure that is most efficient for performing the computing request as the infrastructure to perform the computing request.

In a fifth embodiment alone or in combination with any of the first through fourth embodiments, the process flow 600 may include, when determining which infrastructure is most efficient for performing the computing request, determine which infrastructure is most cost efficient.

In a sixth embodiment alone or in combination with any of the first through fifth embodiments, the process flow 600 may include, when determining which infrastructure is most efficient for performing the computing request, determine which infrastructure is most time efficient.

In a seventh embodiment alone or in combination with any of the first through sixth embodiments, the process flow 600 may include, when determining which infrastructure is most efficient for performing the computing request, determining, for each infrastructure, a cost of performing the computing request to obtain costs, determining, for each infrastructure, an estimated time to complete performing the computing request to obtain estimated completion times, and determining, based on the costs and the estimated completion times, which infrastructure is most efficient for performing the computing request.

In an eighth embodiment alone or in combination with any of the first through seventh embodiments, the process flow 600 may include, before providing the computing request and the input data, encrypting the computing request and the input data to obtain an encrypted computing request and encrypted input data, and, when providing the computing request and the input data, providing the encrypted computing request and the encrypted input data.

In a ninth embodiment alone or in combination with any of the first through eighth embodiments, the output data may include one or more prices, one or more probabilities, processed data from batch processing, and/or the like.

In a tenth embodiment alone or in combination with any of the first through ninth embodiments, the process flow 600 may include, when receiving the output data, receiving encrypted output data and decrypting the encrypted output data.

In an eleventh embodiment alone or in combination with any of the first through tenth embodiments, the process flow 600 may include generating a portal including the output data and causing, a user device, to display the portal.

In a twelfth embodiment alone or in combination with any of the first through eleventh embodiments, the process flow 600 may include receiving multiple computing requests, identifying, from the group of available infrastructures and for each of the computing requests, an infrastructure to perform the computing request, providing, for each of the computing requests and via the blockchain distributed ledger, the computing request and input data for the computing request to the identified infrastructure, and receiving, from each identified infrastructure and via the blockchain distributed ledger, output data for each of the computing requests.

Although FIG. 6 shows example blocks of process flow 600, in some embodiments, process flow 600 may include additional blocks, fewer blocks, different blocks, or differently arranged blocks than those depicted in FIG. 6. Additionally, or alternatively, two or more of the blocks of process flow 600 may be performed in parallel.

As noted above, in some embodiments, the process flow 400 and/or the process flow 600 may include performing one or more of the functions described herein using a recurrent neural network, machine learning, and/or a machine learning model. For example, the system may provide data from computing requests and/or the like to a machine learning model trained (e.g., using historical data) to output prices, probabilities, and/or the like.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning model may be generated by training on historical data associated with computing requests, prices, probabilities, market parameters, and/or the like over a predetermined past period of time. In doing so, the system may be configured to generate predicted prices, probabilities, market parameters, and/or the like. In some embodiments, the one or more machine learning algorithms may be used to calculate likelihoods, and whether the likelihoods satisfy a threshold.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for implementing hybrid cloud computation engines using infrastructure optimization, the system comprising:
    at least one non-transitory storage device; and
    at least one processing device coupled to the at least one non-transitory storage device, wherein the at least one processing device is configured to:
        identify, from a group of available infrastructures, an infrastructure to perform a computing request, wherein the group of available infrastructures comprises an enterprise infrastructure and one or more cloud provider infrastructures, wherein each of the one or more cloud provider infrastructures has access to a recurrent neural network;
        provide, to the identified infrastructure and via a blockchain distributed ledger, the computing request and input data for the computing request, wherein the computing request comprises a request to generate, using the recurrent neural network, based on data in the blockchain distributed ledger, and based on the input data, output data, wherein the blockchain distributed ledger comprises a first node stored on the enterprise infrastructure and additional nodes, wherein each additional node is stored on one of the one or more cloud provider infrastructures, and wherein generating the output data comprises performing a financial computation using the recurrent neural network to generate the output data;
        receive, from the identified infrastructure and via the blockchain distributed ledger, the output data; and
        update the recurrent neural network using the output data.

2. The system of claim 1, wherein the group of available infrastructures comprises two or more cloud provider infrastructures.

3. The system of claim 1, wherein the system and the enterprise infrastructure are associated with a first entity, and wherein the group of available infrastructures comprises a first cloud provider infrastructure associated with a second entity and a second cloud provider infrastructure associated with a third entity.

4. The system of claim 1, wherein the enterprise infrastructure comprises applications, grid servers, virtual servers, and at least one data structure.

5. The system of claim 1, wherein the at least one processing device is configured to, when identifying the infrastructure to perform the computing request:
    determine, based on pricing data and based on historical infrastructure performance data, which infrastructure, of the group of available infrastructures, is most efficient for performing the computing request; and
    identify the infrastructure that is most efficient for performing the computing request as the infrastructure to perform the computing request.

6. The system of claim 5, wherein the at least one processing device is configured to, when determining which infrastructure is most efficient for performing the computing request, determine which infrastructure is most cost efficient.

7. The system of claim 5, wherein the at least one processing device is configured to, when determining which infrastructure is most efficient for performing the computing request, determine which infrastructure is most time efficient.

8. The system of claim 5, wherein the at least one processing device is configured to, when determining which infrastructure is most efficient for performing the computing request:
    determine, for each infrastructure, a cost of performing the computing request to obtain costs;
    determine, for each infrastructure, an estimated time to complete performing the computing request to obtain estimated completion times; and
    determine, based on the costs and the estimated completion times, which infrastructure is most efficient for performing the computing request.

9. The system of claim 1, wherein the at least one processing device is configured to:
    before providing the computing request and the input data, encrypt the computing request and the input data to obtain an encrypted computing request and encrypted input data; and
    when providing the computing request and the input data, provide the encrypted computing request and the encrypted input data.

10. The system of claim 1, wherein the output data comprises at least one of one or more prices, one or more probabilities, or processed data from batch processing.

11. The system of claim 1, wherein the at least one processing device is configured to:
    when receiving the output data, receive encrypted output data; and
    decrypt the encrypted output data.

12. The system of claim 1, wherein the at least one processing device is configured to:
    generate a portal comprising the output data; and
    cause, a user device, to display the portal.

13. The system of claim 1, wherein the at least one processing device is configured to:
    receive multiple computing requests;
    identify, from the group of available infrastructures and for each of the computing requests, an infrastructure to perform the computing request;

provide, for each of the computing requests and via the blockchain distributed ledger, the computing request and input data for the computing request to the identified infrastructure; and receive, from each identified infrastructure and via the blockchain distributed ledger, output data for each of the computing requests.

14. A computer program product for implementing hybrid cloud computation engines using infrastructure optimization, the computer program product comprising a non-transitory computer-readable medium comprising code causing a first apparatus to:

identify, from a group of available infrastructures, an infrastructure to perform a computing request, wherein the group of available infrastructures comprises an enterprise infrastructure and one or more cloud provider infrastructures, wherein each of the one or more cloud provider infrastructures has access to a recurrent neural network;

provide, to the identified infrastructure and via a blockchain distributed ledger, the computing request and input data for the computing request, wherein the computing request comprises a request to generate, using the recurrent neural network, based on data in the blockchain distributed ledger, and based on the input data, output data, wherein the blockchain distributed ledger comprises a first node stored on the enterprise infrastructure and additional nodes, wherein each additional node is stored on one of the one or more cloud provider infrastructures, and wherein generating the output data comprises performing a financial computation using the recurrent neural network to generate the output data;

receive, from the identified infrastructure and via the blockchain distributed ledger, the output data; and update the recurrent neural network using the output data.

15. The computer program product of claim 14, wherein the group of available infrastructures comprises two or more cloud provider infrastructures.

16. The computer program product of claim 14, wherein the first apparatus and the enterprise infrastructure are associated with a first entity, wherein the group of available infrastructures comprises a first cloud provider infrastructure associated with a second entity and a second cloud provider infrastructure associated with a third entity.

17. The computer program product of claim 14, wherein the enterprise infrastructure comprises applications, grid servers, virtual servers, and at least one data structure.

18. The computer program product of claim 14, wherein the computer program product comprises a non-transitory computer-readable medium comprising code causing a first apparatus to:

determine, based on pricing data and based on historical infrastructure performance data, which infrastructure, of the group of available infrastructures, is most efficient for performing the computing request; and identify the infrastructure that is most efficient for performing the computing request as the infrastructure to perform the computing request.

19. The computer program product of claim 18, wherein the computer program product comprises a non-transitory computer-readable medium comprising code causing a first apparatus to, when determining which infrastructure is most efficient for performing the computing request, determine which infrastructure is most cost efficient.

20. A method for implementing hybrid cloud computation engines using infrastructure optimization, the method comprising:

identifying, from a group of available infrastructures, an infrastructure to perform a computing request, wherein the group of available infrastructures comprises an enterprise infrastructure and one or more cloud provider infrastructures, wherein each of the one or more cloud provider infrastructures has access to a recurrent neural network;

providing, to the identified infrastructure and via a blockchain distributed ledger, the computing request and input data for the computing request, wherein the computing request comprises a request to generate, using the recurrent neural network, based on data in the blockchain distributed ledger, and based on the input data, output data, wherein the blockchain distributed ledger comprises a first node stored on the enterprise infrastructure and additional nodes, wherein each additional node is stored on one of the one or more cloud provider infrastructures, and wherein generating the output data comprises performing a financial computation using the recurrent neural network to generate the output data;

receiving, from the identified infrastructure and via the blockchain distributed ledger, the output data; and updating the recurrent neural network using the output data.

* * * * *